United States Patent [19]
Field et al.

[11] Patent Number: 6,111,956
[45] Date of Patent: Aug. 29, 2000

[54] METHOD FOR SECURE KEY DISTRIBUTION OVER A NONSECURE COMMUNICATIONS NETWORK

[75] Inventors: Robert G. Field, McLean; Michael W. Layne, Ashburn, both of Va.

[73] Assignee: Signals, Inc., Hernoon, Va.

[21] Appl. No.: 09/017,891

[22] Filed: Feb. 3, 1998

Related U.S. Application Data

[63] Continuation-in-part of application No. 08/956,720, Oct. 23, 1997.

[51] Int. Cl.⁷ .................................. H04L 9/12; H04L 9/08
[52] U.S. Cl. ............................................. 380/283; 713/202
[58] Field of Search .................... 380/48, 21, 49, 380/278, 283, 285

[56] References Cited

U.S. PATENT DOCUMENTS

| | | | |
|---|---|---|---|
| 3,825,255 | 7/1974 | Kennard et al. | 273/1 |
| 4,375,666 | 3/1983 | Buck et al. | 364/410 |
| 5,046,092 | 9/1991 | Walker et al. | 380/20 |
| 5,150,411 | 9/1992 | Maurer | 380/30 |
| 5,196,840 | 3/1993 | Leith et al. | 340/825.3 |
| 5,222,140 | 6/1993 | Beller et al. | 380/30 |
| 5,425,102 | 6/1995 | Moy | 380/25 |
| 5,434,918 | 7/1995 | Kung et al. | 380/25 |
| 5,870,475 | 2/1999 | Allan et al. | 380/21 |

OTHER PUBLICATIONS

Schneier, Bruce. Applied Cryptography, 2nd ed. John Wiley and Sons, Inc. p. 49, 1996.

*Primary Examiner*—Gail O. Hayes
*Assistant Examiner*—Anthony DiLorenzo
*Attorney, Agent, or Firm*—Clyde R. Christofferson

[57] ABSTRACT

In response to an inquiry by an unsophisticated Subscriber over a nonsecure network, a Provider returns a public key and retains the corresponding private key. The Subscriber encrypts a password using the public key, which is decrypted by the Provider. The password is then used to securely transfer to the Subscriber a key determined by the Provider, thereby enabling the Subscriber to decrypt messages encrypted by the Provider and transmitted over the nonsecure network. This password dependent secure transmission of a key to an unsophisticated Subscriber may be accomplished by several methods, including hashing, key lookup, Wizard protocol, and Warlock procedure. In each method the password is used by the Subscriber and the Provider in correlated operations ending in secure receipt by the Subscriber of a key determined by the Provider.

20 Claims, 8 Drawing Sheets

METHOD FOR SECURE KEY DISTRIBUTION OVER A NONSECURE COMMUNICATIONS NETWORK

This application is a Continuation in Part of application Ser. No.: 08/956,720 filed on Oct. 23, 1997 and having the same title.

BACKGROUND OF THE INVENTION

1. Field of the Invention

The present invention generally relates to secure key cryptography, and in particular to methods for distributing key material in a secure manner over a nonsecure network.

2. Background Description

Currently, there is no acceptable way to distribute key material over the commercial telecommunications network in a secure manner, without the separate distribution of a password, key, certificate or token (either through the mail, or a physical third party interaction). The network is non-secure and subject to compromise by a skilled Interloper. The difficulty of secure communications under the prior art may be understood by reference to the following assumptions: (1) an Interloper on the network can intercept all communications between a Subscriber and a commercial Provider; (2) the Interloper has all the facilities of the Subscriber, but does not have the facilities of the Provider; (3) the Subscriber (hitherto unknown to the Provider) is responding to the Provider's solicitation, but has no material provided by the Provider; and (4) the Subscriber will attempt to set up a secure account on his first digital contact with the Provider using commercially available software (e.g., off-the-shelf web browser, etc.).

FIG. 1A shows a Provider of services and a potential Subscriber to those services connected to a nonsecure network in accordance with the foregoing assumptions. FIG. 1B shows message traffic when a potential Subscriber and a service Provider try to establish a session in the presence of an Interloper on the network.

A number of prior art solutions require the use of several open or "public" keys. An encryption method is said to be a public key encryption scheme when, for each associated encryption/decryption pair, one key (the public key) is made publicly available, while the other key (the private key) is kept secret. The following attributes characterize public key encryption: (i) keys are generated in pairs, consisting of a public key and a private key; (ii) there is always a mathematical relationship between the two keys, but this relationship is based on some "hard" problem (i.e. one that cannot be solved in a reasonable amount of time using any computer system currently available); (iii) the private key cannot be derived from its corresponding public key; and (iv) information encrypted in the public key can only be decrypted by its corresponding private key There are several key patents and established protocols that are applicable and serve in their own ways as predecessors for the methods of passing electronic keys in accordance with the present invention, as will be described hereafter.

U.S. Pat. No. 3,962,539 to Ehrsam et al. sets forth the algorithm for generating block ciphers, outlining how key bits are used, regarding the nonlinear transformation within S-boxes, and regarding a particular permutation. The DES cipher, although an improvement on the preexisting cipher put forth in the Feistel patent (U.S. Pat. No. 3,798,359), does not address a protocol for secure transmission of a cipher key between two parties, via an electronic, real-time medium, where neither party has any a priori knowledge of the other.

U.S. Pat. No. 4,200,770 to Hellman et al. is the first public-key patent issued and offers a solution for communicating securely over a nonsecure channel without a priori shared keys. Security rests on the intractability of the Diffie-Hellman problem and the related problems of computing discrete logarithms. This method provides protection from passive adversaries (eavesdroppers), but not from active adversaries capable of intercepting, modifying, or injecting messages. The weaknesses in this system spring from neither party having any assurance of the source identity of incoming messages or the identity of the party which may know the resulting key, i.e., there is no entity authentication or key authentication. The general class of attacks that this solution is vulnerable to may be prevented by authenticating the exchanged exponentials, e.g., by a digital signature. A solution offered in a later derivation of the Diffie-Hellman patent by El Gamal relies upon a fixed public exponential of the recipient which has verifiable authenticity (e.g. is embedded in a certificate). This solution relies on a physical passing of the certificate from one party to the other by a trusted third party.

The RSA public-key encryption and signature system (described in U.S. Pat. No. 4,405,829 to Rivest et al.) outlines the current accepted state of the art for public-key technology. The RSA system represents practical application and derivations of the ideas set forth in the original Diffie-Hellman key agreement patent. Although the methods set forth in this patent provide adequate security for electronic communications, the problem of establishing initial secure electronic contact and transporting keys without a priori shared keys persists. The "hard" problem involved in encrypting and decrypting also places undesired strain on the average user equipped with a standard personal computer system of today's computational limitations.

Perhaps the most relevant example of prior art is a no-key protocol which is attributed to Shamir by Konheim [A. G. Konheim, Cryptography, A Primer, John Wiley and Sons, New York, 1981, p.345]. This protocol allows users A and B to transfer a secret key K with privacy, but no authentication, over a public channel within three passes. This is achieved by first publishing a prime number p chosen such that computation of discrete logarithms modulo p is infeasible. A and B then choose respective secret random numbers a,b and each performs parallel but separate computations of $a^{-1}$ and $b^{-1}$ mod $p^{-1}$. A then chooses a random key K, computes Ka mod p and transports it to B. It is then modified exponentially by B, and then sent back to A, who effectively undoes its previous exponentiation and yields K as altered by B. A then sends back a message, containing the value of $K^b$ mod p to B, who exponentiates the value using his originally generated $b^{-1}$ mod $p^{-1}$, thus yielding the newly shared key K mod p.

Although this protocol does describe a method that theoretically passes a previously unknown key to a user, it has not been put into practical commercial use because of the impractical computational strain on the average user who would be in need of establishing an immediate secure communications link with a Provider.

SUMMARY OF THE INVENTION

It is therefore an object of the present invention to provide a secure key transfer method that is practical to use for a Subscriber who wants to immediately establish a secure link with a Provider with whom the Subscriber has had no prior dealings.

It is a further object of the invention to provide a secure exchange of keys between a Subscriber and a Provider, where an Interloper has every facility of the Subscriber but does not have the facilities of the Provider.

It is also an object of the invention to provide a secure transmission of a key from a Provider to a Subscriber, where the Subscriber has only limited computation and communications capabilities.

Another object of the invention is to permit a Subscriber to securely receive a key from a Provider over a nonsecure network without depending upon key creation capabilities in the hands of the Subscriber.

Another object of the invention is to permit a Subscriber to securely receive a key from a Provider over a nonsecure network without depending upon the Subscriber already having a private key corresponding to a public key which could be made available to the Provider.

In accordance with the invention, in response to an inquiry by a Subscriber over a nonsecure network, a Provider in return over the nonsecure network supplies the Subscriber with a public key and retains the corresponding private key. The Subscriber uses this public key to encrypt a password known only to the Subscriber. The password is decrypted by the Provider using the corresponding private key, so that both Subscriber and Provider know the Subscriber's password.

The password is then used to securely transfer to the Subscriber a key determined by the Provider, thereby enabling the Subscriber to decrypt messages encrypted by the Provider and transmitted over the nonsecure network. While the Provider has facilities to create keys and perform complex calculations, the Subscriber is unsophisticated and can only operate off-the-shelf communications programs (such as a browser) and programs which can be supplied by the Provider over the nonsecure network. This password dependent secure transmission of a key to an unsophisticated Subscriber may be accomplished, in accordance with the invention, by hashing, key lookup, Wizard protocol or Warlock methods. Since all methods described herein are based on a one-time use of a password, they all provide authentication approaching strong authentication [Menezes, et al., *Handbook of Applied Cryptography*, CRC Press, Boca Raton, 1997, p.395].

The hashing method requires a matched pair of hashing algorithms, h1 and h2. Algorithm h1 along with a public key is transmitted in the clear by the Provider to the Subscriber. The Subscriber applies this algorithm h1 to the public key, using the password, thereby generating Subscriber Key H. Similarly, the Provider applies algorithm h2 to the corresponding private key, using the same password, thereby generating Provider Key H. Algorithms h1 and h2 are such that messages encrypted by the Provider using Provider Key H may be decrypted by the Subscriber using Subscriber Key H. The Provider uses Provider Key H only once, to encrypt Subscriber Key F which the Subscriber decrypts using Subscriber Key H.

Under the key lookup method, the Provider sends a suitably long table of private keys to the Subscriber over the nonsecure network, together with a lookup algorithm usable with the password as a parameter to select a key from the table. Using the password as a parameter in the lookup algorithm, the Subscriber selects Subscriber Key L and the Provider selects the corresponding Provider Key L. These keys are used only once, by the Provider to encrypt (using Provider Key L) and by the Subscriber to decrypt (using Subscriber Key L) the Subscriber Key F.

The Wizard protocol is an iterative guessing technique which uses the password as the initial guess of a final Subscriber Key F. In the simplest implementation of the Wizard protocol, the final Subscriber Key F would be the same length as the password. As a practical matter, if the Provider wants to use a key of a particular length, he could ask the Subscriber to supply a password of the desired length. In this simple implementation, the Provider compares each character of the initial guess with the corresponding character of the desired Subscriber Key F, using the numeric equivalent of the binary representation of the ASCII characters to determine whether the next "guess" of the Subscriber needs to be lower, higher, or should remain the same. Using suitable characters for these three possibilities (e.g. −1 for lower, +1 for higher, and 0 for remain the same), the Provider transmits an unencrypted response to the Subscriber indicating how each character in the password should be changed to improve the guess. The Subscriber then uses the Provider's response to make another "guess" and again encrypts the new guess using the public key earlier supplied by the Provider. The process is repeated until the correct key is determined. In the 8-bit ASCII representation, a maximum of eight guesses will be required for the Subscriber to determine the final Subscriber Key F.

The Warlock procedure . . .

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
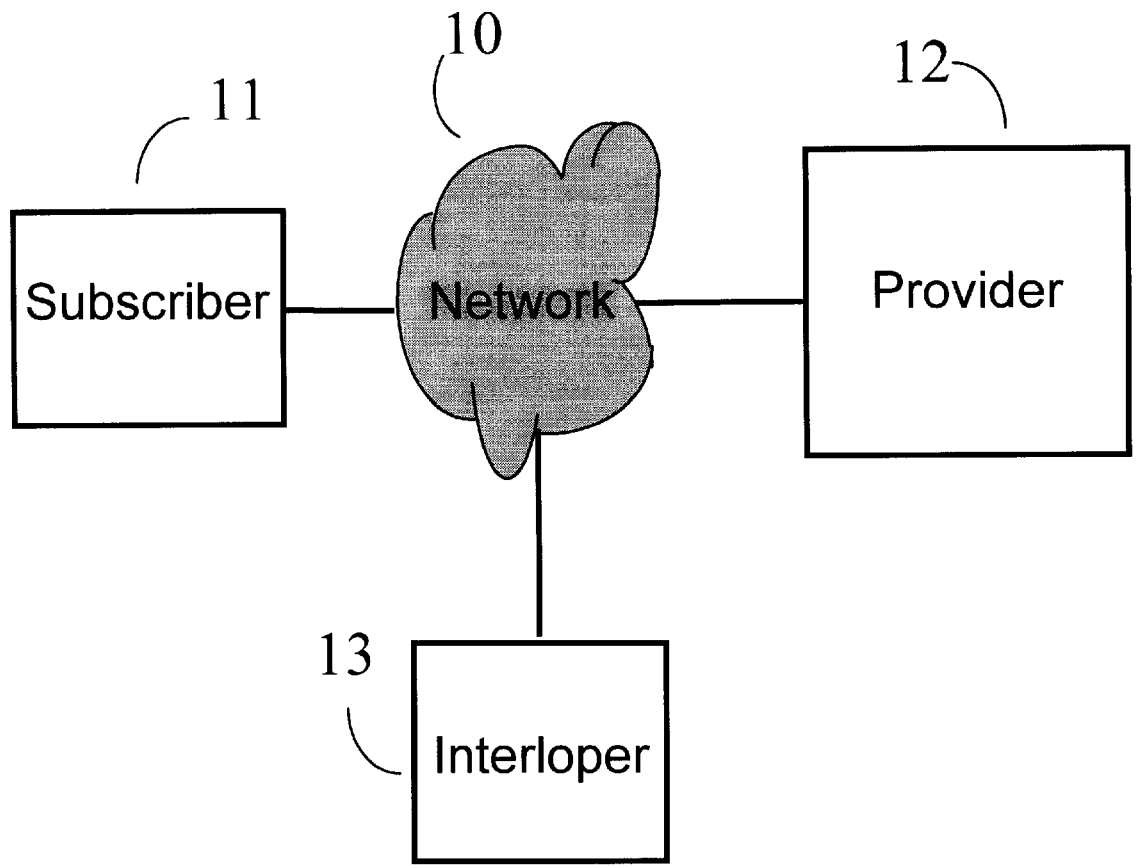
FIGS. 1A and 1B show the components of the problem space: a Subscriber and a Provider who wish to establish a secure communications link over a Network in the presence of an Interloper, as well as the initial contact which is intercepted by an Interloper.
Figure 1B:
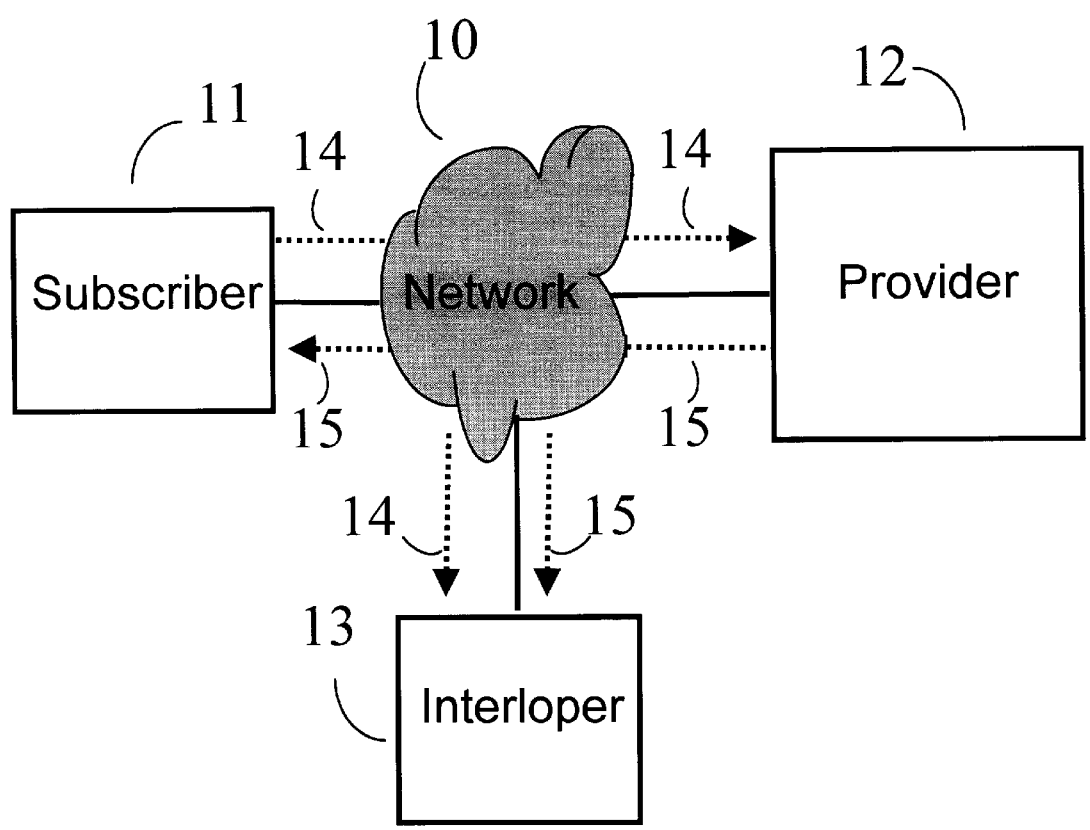

Referring now to the drawings, and more particularly to FIG. 1A, there is shown a diagram of the problem which is to be solved by the present invention. A Subscriber 11 and a Provider 12 wish to establish a secure communications link over a nonsecure Network 10 where an Interloper 13 on the Network 10 has every facility of the Subscriber 11. FIG. 1B shows a call 14 from Subscriber 11 which is sent through Network 10 and received by Provider 12 being intercepted by Interloper 13. FIG. 1B also shows an answer 15 from Provider 12 to Subscriber 11 also being intercepted by Interloper 13.

Figure 2A:
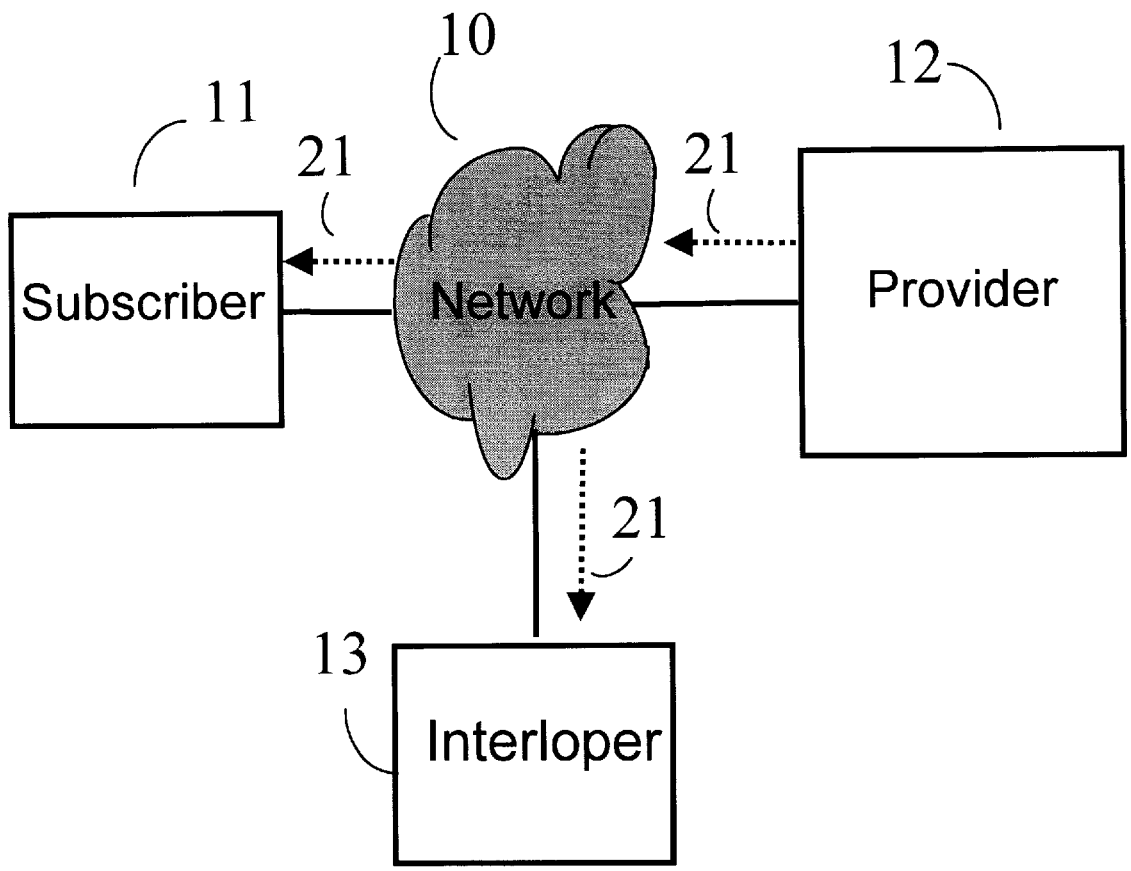
FIGS. 2A and 2B show a sequence of communication steps for secure transmission of the Subscriber's password to the Provider in accordance with the invention.
Figure 2B:
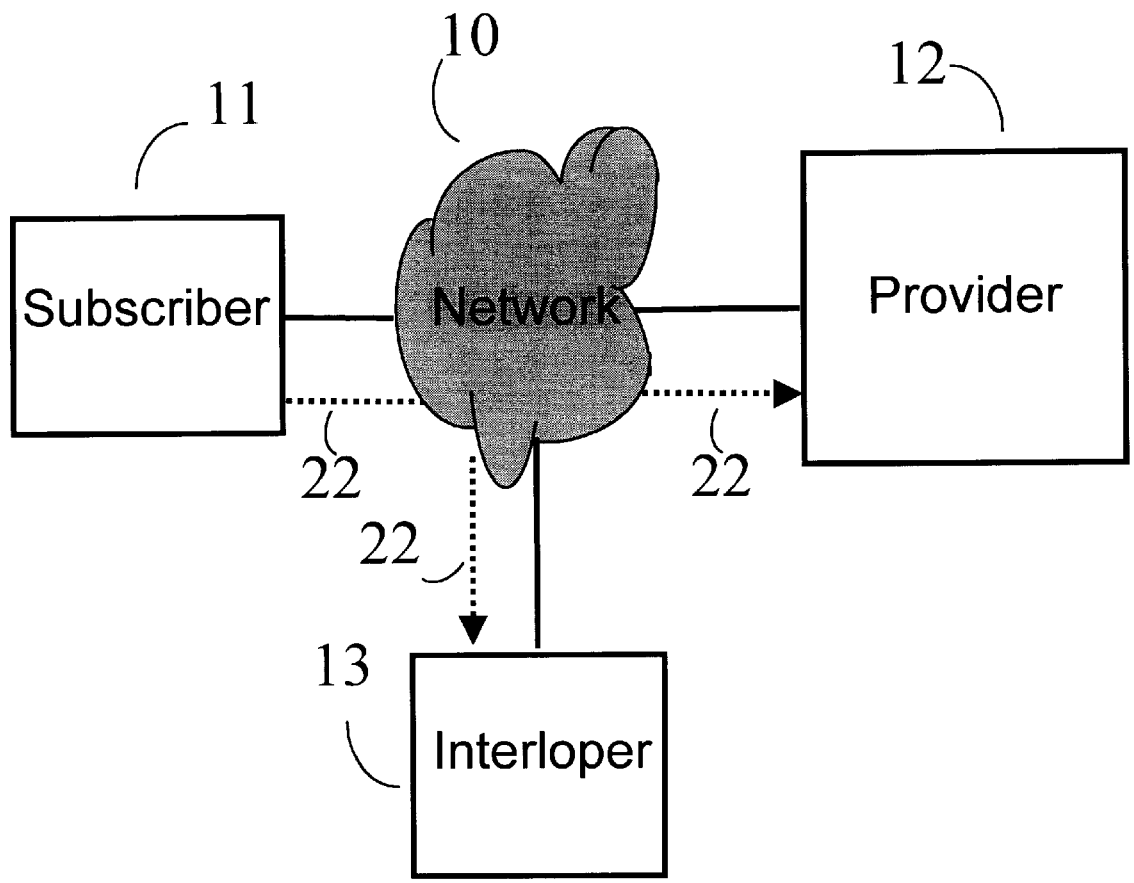

It is normal for a Subscriber 11 to be asked to provide a password when setting up an account on a secure server. If that password can be denied to the Interloper 13, then it can be used as the basis for providing a secure key to the Subscriber 11. Turning now to FIGS. 2A–2B we will show how a password known to Subscriber 11 can be transmitted to Provider 12 in such a fashion that Interloper 13 will not know what the password is.

The first step is for Provider 12 to generate a key pair in accordance with a public key encryption scheme. Subscriber 11 is unsophisticated and therefore lacks this capability. Then Provider 12 sends 21 the public key to Subscriber 11, as shown in FIG. 2A, but retains the private key. The Interloper 13 intercepts the public key. Up to this point, Subscriber 11 and Interloper 13 are identical with respect to the information they share with Provider 12.

After receiving the public key, Subscriber 11 generates an initial password ($P_I$) that is unknown to Interloper 13 and Provider 12. At this point Subscriber 11 has distinguished himself from Interloper 13. Subscriber 11 now encrypts his initial password ($P_I$) using the public key and sends 22 the encrypted password to Provider 12, as shown in FIG. 2B. Since the corresponding key of the pair (i.e. the private key) has been retained by Provider 12, Provider 12 is able to decrypt the password ($P_I$) of Subscriber 11. Because the private key is unknown to Interloper 13, Interloper 13 cannot decrypt the password ($P_I$). At this point, both Provider 12 and Subscriber 11 possess the Subscriber's password ($P_I$).

Secure transmissions from Subscriber 11 to Provider 12 are never a problem, since Subscriber 11 can always use the public key to send encrypted messages to Provider 12, who can decrypt these messages using the corresponding private key, which has been retained by Provider 12 and is not available to Interloper 13. This is how Subscriber 11 is able to transmit password ($P_I$) securely to Provider 12.

However, a key (Subscriber Key F) must now be obtained in a secure manner by Subscriber 11 so that Subscriber 11 will be able to decrypt future transmissions from Provider 12 to Subscriber 11. The present invention accomplishes this by using the password ($P_I$) which both Subscriber 11 and Provider 12 now possess, and which Interloper 13 does not possess.

The mechanisms of the present invention will now be described with reference to FIGS. 3, 4, 5 and 6. In each of these figures, the initial step of secure transmission of a password from Subscriber 11 to Provider 12 over nonsecure network 10 is the same. In response to an initial contact 20 from Subscriber 11, Provider 12 selects 23 a public/private key pair and transmits 21 the public key in the clear to Subscriber 11. Subscriber 11 then uses the public key to encrypt 24 a password and securely transmits 22 the password to Provider 12, who is then able to decrypt 25 the password using the retained private key.

The desired end result of practice of the invention is also shown in each of FIGS. 3, 4, 5 and 6. Provider 12 is able to encrypt 27 a message M and securely transmit 28 that message to Subscriber 11 over nonsecure network 10, whereupon Subscriber 11 is able to decrypt 29 the message using Subscriber Key F, which has been obtained securely over the nonsecure network from Provider 12. In the best mode implementation of the invention, using Subscriber Key F will not require intensive computation by Subscriber 11 and will therefore be usable in a wide variety of message traffic scenarios between Subscriber 11 and Provider 12. Subscriber Key F can also be used to securely receive a new encryption key of a simpler type to be used for further transmissions.

Hashing

Figure 3:
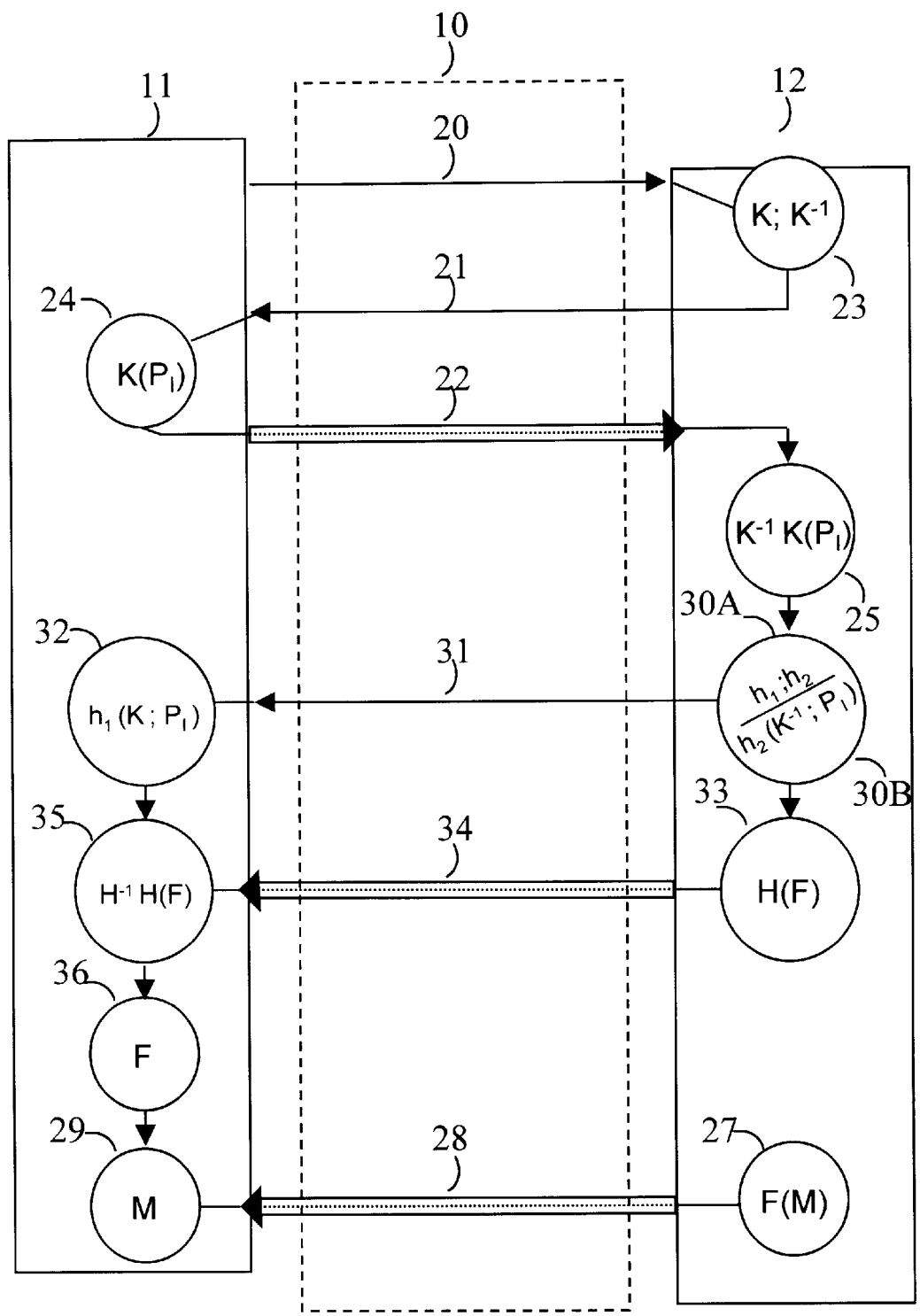
FIG. 3 is a flow chart showing use of a hashing algorithm to securely generate a public/private key pair for use by the Provider to securely transfer a key to the Subscriber.

Turning now to FIG. 3, Provider 12 generates 30A a pair of algorithms $h_1$ and $h_2$ such that, if:

$h_1$ (Password; Public Key)=Subscriber Key H

Then:

$h_2$ (Password; Private Key)=Provider Key H where Subscriber Key H can successfully decrypt messages sent with Provider Key H.

Provider 12 transmits 31 hashing algorithm h1 to Subscriber 11, who then uses it on the public key with the password ($P_I$) as a parameter to generate 32 Subscriber Key H. Provider 12 also uses h2 on the private key with password ($P_I$) as a parameter to generate 30B Provider Key H. Then Provider 12 uses Provider Key H to encrypt 33 Subscriber Key F, which is then securely transmitted 34 to Subscriber 11. Subscriber 11 then decrypts 35 using Subscriber Key H. Subscriber 11 is now in possession 36 of Subscriber Key F.

The hashing algorithm h1 can be public information and sent in the clear to Subscriber 11, since, without Subscriber 11's password, the Interloper 13 cannot replicate this hashing process, and therefore cannot deduce Subscriber Key H. The Interloper 13 has no way of independently creating Subscriber Key H and Provider Key H since, even if he possesses the appropriate algorithms, he never possesses the Subscriber 11s password used in the hashing procedures. The best that the Interloper 13 can do is to take over the entire session and become the Subscriber. If he were to do that, then Subscriber 11 would be barred from the session and would be unable to communicate any sensitive information to the Provider 12.

Because of the computational intensity of public key algorithms, Provider Key H and Subscriber Key H are used only once, to transmit Subscriber Key F (uninterceptable by the Interloper 13) to Subscriber 11 for use in a simpler system such as a symmetric key system. Subscriber Key F can also be used to securely receive a new encryption key of a simpler type to replace the function of the previously used public key used to initially transmit the password ($P_I$) to the Provider 12.

Key Lookup

A key table, generated by Provider 12 can also be used to facilitate the secure determination of a suitable Subscriber Key L by the Subscriber 11. This table would have to be acceptably long and have the following structure:

| Public Keys | Private Keys |
|---|---|
| $K_{U1}$ | $K_{R1}$ |
| $K_{U2}$ | $K_{R2}$ |
| $K_{U3}$ | $K_{R3}$ |
| ... | ... |
| $K_{Un4}$ | $K_{Rn}$ |

Figure 4:
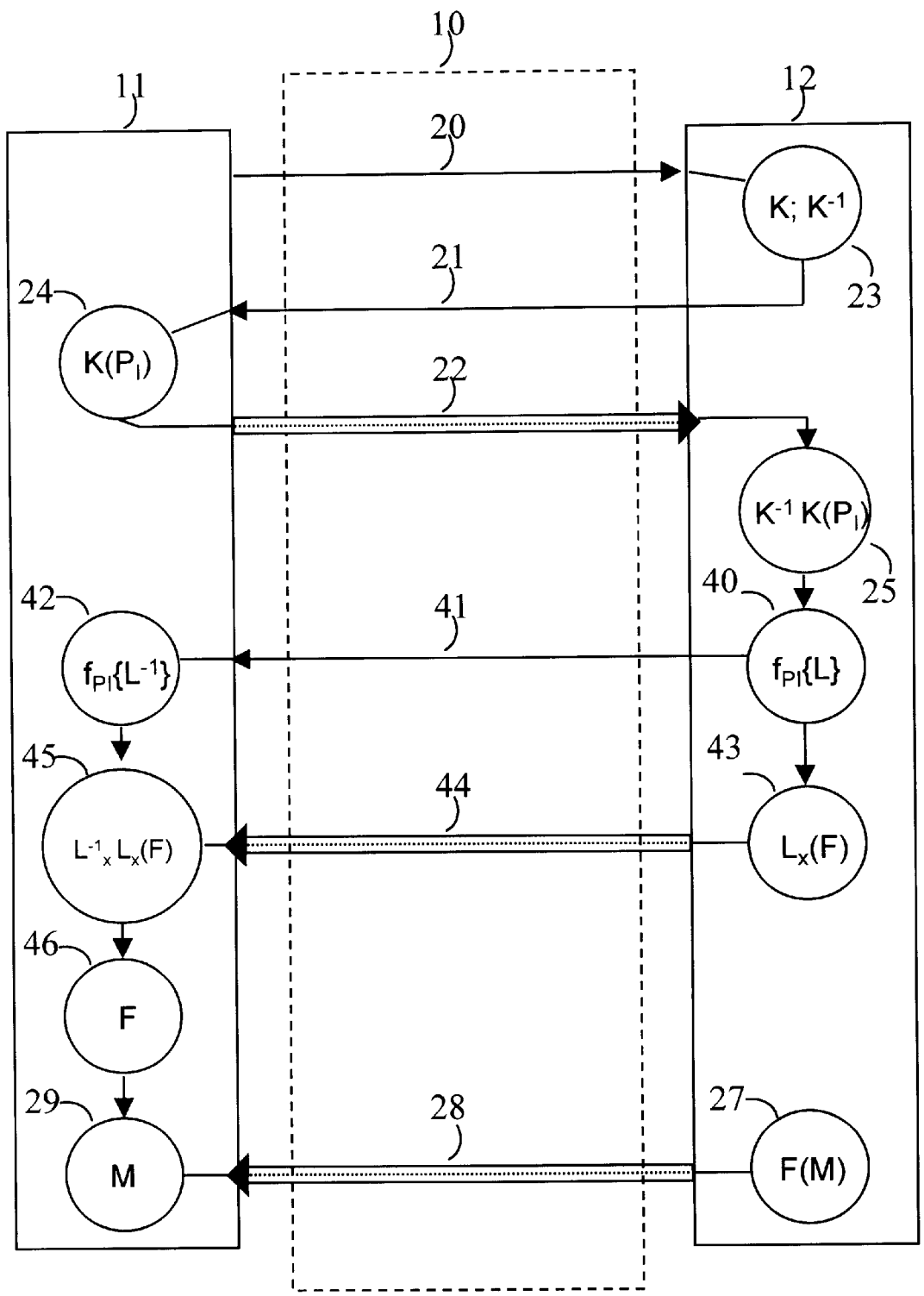
FIG. 4 is a flow chart showing use of a key lookup method to securely select a public/private key pair for use by the Provider to securely transfer a key to the Subscriber.

Turning now to FIG. 4, the entire column of Private Keys is sent 41 from Provider 12 to Subscriber 11, together with a lookup algorithm usable with the password ($P_I$) as a parameter to select a key from the table. As a practical matter this sending 41 of the column of Private Keys can be combined with the initial transmission 21 of the public key. Subscriber 11 and Provider 12 then can use the Subscriber 11's password ($P_I$) (once it is common knowledge to Provider 12 and Subscriber 11) as a lookup parameter. Provider 12 uses 40 password ($P_I$) as a lookup parameter on his list of Public Keys to determine Provider Key L, while Subscriber 11 uses 42 password ($P_I$) as a lookup parameter on his list of Private Keys to determine Subscriber Key L. Since both Provider 12 and Subscriber 11 use the same password as a lookup parameter on corresponding key columns, Subscriber 11 and Provider 12 will select corresponding keys. With Subscriber Key L, Subscriber 11 will be able to decrypt a message from Provider 12 encrypted with Provider Key L. Not knowing the password prevents the Interloper 13 from looking up the correct Subscriber Key L from his column of private keys, except through an unrealistically "hard" process of trial and error.

This situation leaves the Interloper 13 with the strategy of trying all of the keys in real-time to determine the correct one. The Interloper 13's only viable approach is an exhaustive search over the entire key space. If the length of the key lookup table is sufficiently large, and periodic rekeying is enforced, the resulting threat is reduced to an acceptable level, because Subscriber Key L is used for only a single transmission (in order to send Subscriber Key F, preferably a simpler type of key which is easier for the subscriber to use, for continued future transmissions) and can then be erased. Even if the Interloper 13 were to systematically try each private key to decrypt the message that contains Subscriber Key F, because Subscriber Key F has no discernible syntax, the Interloper 13 is unable to distinguish the correct key string from the large number of other strings his search would produce. This reduces the probability of statistical cryptanalysis by the Interloper 13 to virtually zero.

Wizard Protocol

The Wizard protocol is a transfer process easily used to transfer a Subscriber Key F of an arbitrary length and type from Provider 12 to the Subscriber 11. A key of any length and type can be sent, but considering the computational difficulty of decrypting messages on a continual basis using public key algorithms, in the best mode of practice of the invention Subscriber Key F will be a symmetric key or a key from another computationally easy key system. For the sake of discussing this solution, assume that a sixty-four (64) bit key (8 ASCII characters), held and created by Provider 12, needs to be "known" by Subscriber 11 so that Subscriber 11 can decrypt messages sent from Provider 12 on a continuing basis. The word "known" is used instead of "sent" because, using the Wizard protocol, Subscriber 11 actually converges on the Subscriber Key F using his unique password ($P_I$) as the starting point for his approximations.

Figure 5:
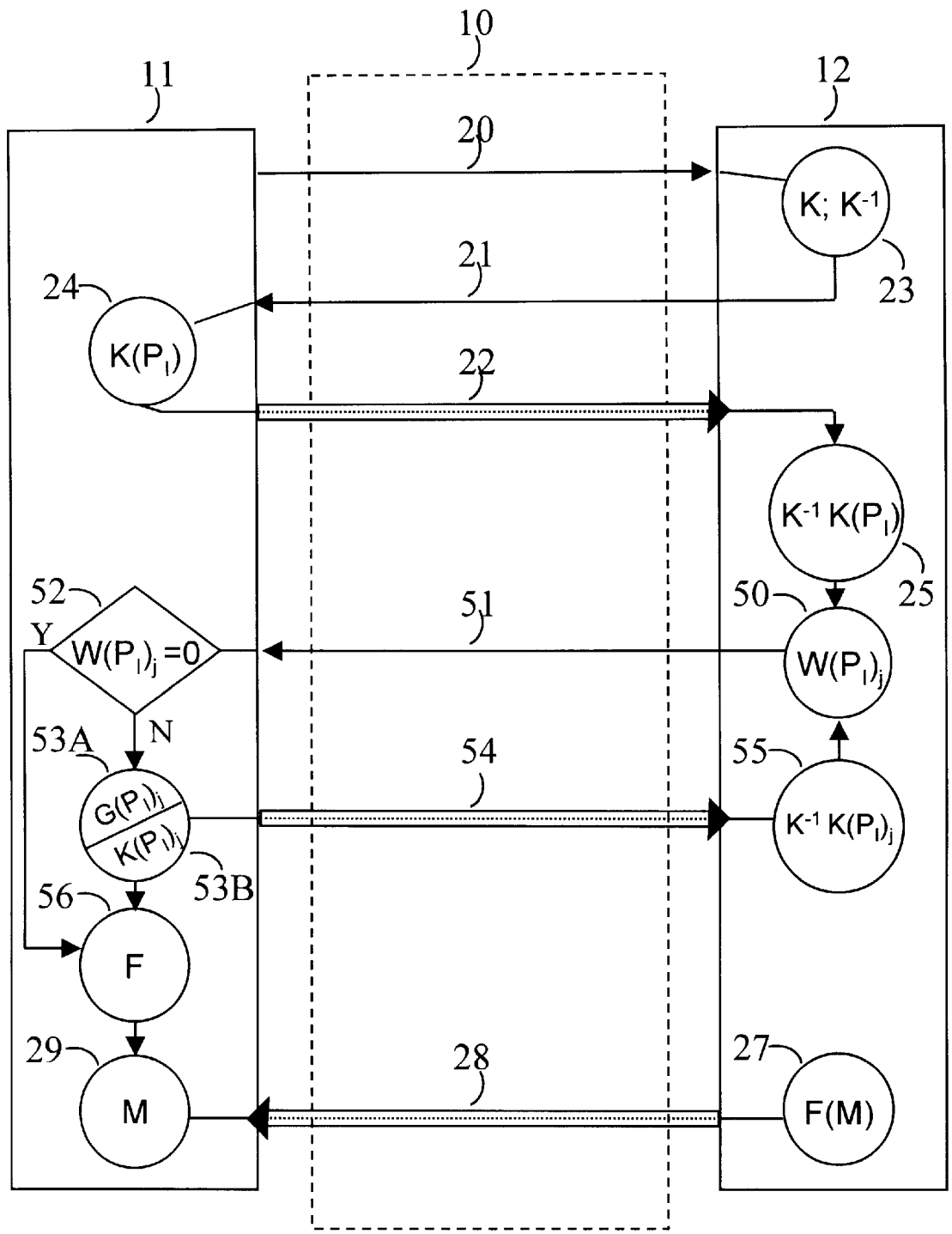
FIG. 5 is a flow chart showing use of an iterative guessing technique to securely transfer a key from the Provider to the Subscriber.

Turning now to FIG. 5, after Subscriber 11 makes the initial network contact 20 with Provider 12, Subscriber 11 creates a password ($P_I$) of the desired length with no discernible syntax and then sends 22 Provider 12 the password ($P_I$), encrypted 24 with the Public Key which has been sent 21 by Provider 12 along with the desired length for the password. Provider 12 uses the retained Private Key to decrypt 25 the password. Both Provider 12 and Subscriber 11 now share Subscriber 11's password ($P_I$). The Interloper 13, with no way to decrypt the password ($P_I$), has no usable information.

Provider 12 then compares 50 each character of the password ($P_I$) with the respective character of the Subscriber Key F he wishes Subscriber 11 to possess. For an illustrative case of a sixty-four bit (8 ASCII character) key, the comparison is shown as follows:

| Password $P_I$ | Subscriber Key F |
|---|---|
| G | ! |
| % | # |
| S | a |
| @ | S |
| W | @ |
| " | d |
| R | R |
| $ | f |

In ASCII this password ($P_I$) is represented by the octet 71, 37, 83, 64, 87, 34, 82, 36. The Subscriber Key F is represented by 33, 35, 97, 83, 64, 100, 82, 102, respectively.

Again referring to FIG. 5, provider 12 then sends 51 an unencrypted response that tells the Subscriber 11, character-by-character (in the case illustrated above, for each of eight ASCII characters), what action he should take for his next guess. The Provider 12's response takes the following form or some comparable form that relays the guessing advice:

$$-1, -1, +1, +1, -1, +1, 0, +1$$

where −1=Guess Lower, 0=You've Guessed the Character Correctly, and +1=Guess Higher.

Subscriber 11 evaluates 52 the response from Provider 12 and, unless all characters have been guessed correctly, constructs 53A a new guess. Each guess for each character not correctly guessed on the prior guessing cycle is decremented or incremented by $2^{(n-j)}$, where n is the number of bits used to encode each character (For ASCII, n=8) and j is the guess number. Subscriber 11 then encrypts 53B the revised password ($P_I)_j$ using the public key and sends it 54 to Provider 12. Provider 12 decrypts 55 using the private key and again compares 50 the revised password to Subscriber Key F. This cycle is repeated until Subscriber 11 correctly guesses Subscriber Key F.

Using the 8-bit ASCII alphabet, it may not take a full 8 guesses to ascertain the Subscriber Key F, but it will take no more than 8 guesses. Although an eight character key has been used for purposes of illustration, the length of the key does not affect the number of guesses required. As each character is guessed correctly, Subscriber 11 continues to send 54 the correct guesses along with the revised guesses for the other characters until all characters of Subscriber Key F are discovered 56. Doing this helps minimize the computational strain on Subscriber 11.

The complete process for these postulated values is shown in table 2.

TABLE 2

| | Guess from Subscriber | Response from Provider |
|---|---|---|
| Password (Guess 1) | 71, 37, 83, 64, 87, 34, 82, 36 | Response 1 −1, −1, +1, +1, −1, +1, 0, +1 |
| Guess 2 (Guess 1 ± 128) | −57, −91, 211, 192, −41, 162, 82, 164 | Response 2 +1, +1, −1, −1, +1, +1, 0, −1 |

TABLE 2-continued

| Guess from Subscriber | | Response from Provider | |
|---|---|---|---|
| Guess 3 (Guess 2 ± 64) | 7, −27, 147, 128, 23, 98, 82, 100 | Response 3 | +1, +1, −1, −1, +1, +1, 0, +1 |
| Guess 4 (Guess 3 ± 32) | 39, 5, 115, 96, 55, 130, 82, 132 | Response 4 | −1, +1, −1, −1, +1, −1, 0, −1 |
| Guess 5 (Guess 4 ± 16) | 23, 21, 99, 80, 71, 114, 82, 116 | Response 5 | +1, +1, −1, +1, −1, −1, 0, −1 |
| Guess 6 (Guess 5 ± 8) | 31, 29, 91, 88, 63, 106, 82, 108 | Response 6 | +1, +1, +1, −1, +1, −1, 0, −1 |
| Guess 7 (Guess 6 ± 4) | 35, 33, 95, 84, 67, 102, 82, 104 | Response 7 | −1, +1, +1, −1, −1, −1, 0, −1 |
| Guess 8 (Guess 7 ± 2) | 33, 35, 97, 82, 65, 100, 82, 102 | Response 8 | 0, 0, 0, +1, −1, 0, 0, 0 |
| Decryption Key | 33, 35, 97, 83, 64, 100, 82, 102 | | |

If this technique were used to encode a different alphabet, n would correspond to the number of bits used to encode that alphabet. For example, the EBCDIC alphabet contains 64 characters and therefore requires 6 bits to encode each letter and 6 iterations to guess the Subscriber Key F. This technique could also be used to encode entire words rather than characters. If the Wizard Protocol were expanded to include 16 guesses, messages created from a dictionary of 65,536 words could be transmitted.

Warlock Procedure

The Warlock procedure is a transfer process easily used to transfer a Subscriber Key F of an arbitrary length and type from Provider 12 to the Subscriber 11. A key of any length and type can be sent, but considering the computational difficulty of decrypting messages on a continual basis using public key algorithms, in the best mode of practice of the invention Subscriber Key F will be a symmetric key or a key from another computationally easy key system. For the sake of discussing this solution, assume that a sixty-four (64) bit key (8 ASCII characters), held and created by Provider 12, needs to be "known" by Subscriber 11 so that Subscriber 11 can decrypt messages sent from Provider 12 on a continuing basis. The word "known" is used instead of "sent" because, using the Warlock procedure, Subscriber 11 actually alters his unique password ($P_I$) to become the Subscriber Key F, based on exact guidance from the Provider 12. This way of transporting a key to a Subscriber 11 represents a preferred embodiment and best mode of practicing the present invention.

Figure 6:
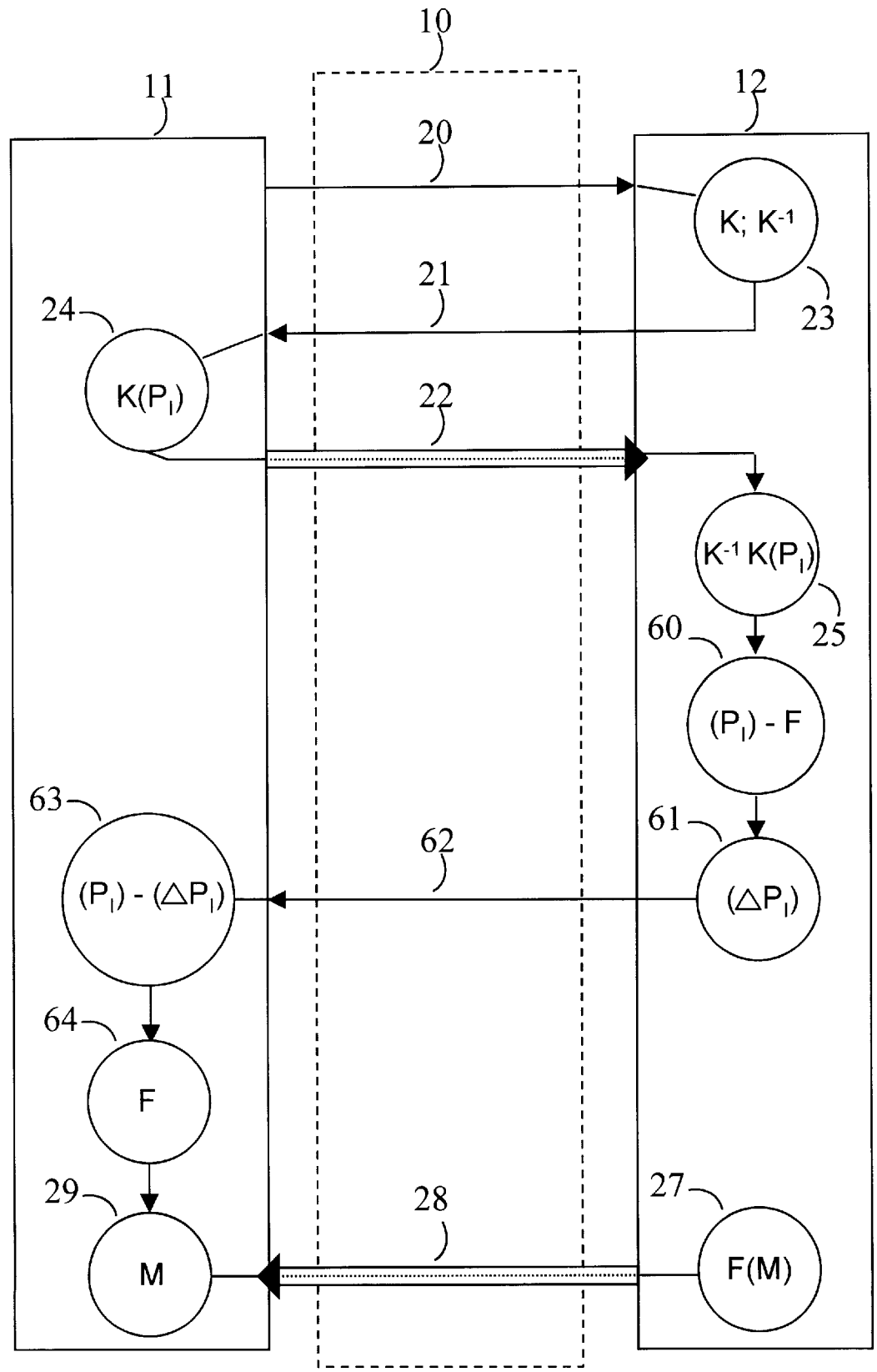
FIG. 6 is a flow chart showing use of a character alteration technique to securely transfer a key from the Provider to the Subscriber.

Turning now to FIG. 6, after Subscriber 11 makes the initial network contact 20 with Provider 12, Subscriber 11 creates a password ($P_I$) of the desired length with no discernible syntax and then sends 22 Provider 12 the password ($P_I$), encrypted 24 with the Public Key which has been sent 21 by Provider 12 along with the desired length for the password. Provider 12 uses the retained Private Key to decrypt 25 the password. Both Provider 12 and Subscriber 11 now share Subscriber 11's password ($P_I$). The Interloper 13, with no way to decrypt the password ($P_I$), has no usable information.

Provider 12 then compares 60 each element of the password ($P_I$) with the respective element of the Subscriber Key F he wishes Subscriber 11 to possess. For an illustrative case of a sixty-four bit (8 ASCII character) key, the comparison is shown as follows:

| Password $P_I$ | Subscriber Key F |
|---|---|
| G | ! |
| % | # |
| S | a |
| @ | S |
| W | @ |
| " | d |
| R | R |
| $ | f |

In ASCII this password ($P_I$) is represented by the octet 71, 37, 83, 64, 87, 34, 82, 36. The Subscriber Key F is represented by 33, 35, 97, 83, 64, 100, 82, 102, respectively.

Again referring to FIG. 6, Provider 12 then sends 62 an unencrypted response that tells the Subscriber 11, character-by-character (in the case illustrated above, for each of eight ASCII characters), what action he should take to alter the password ($P_I$) so that it becomes the Subscriber Key F. The Provider 12's response takes the following form or some comparable form that relays the required changes:

−38, −2, +14, +19, −23, +66, 0, +66 where the numbers tell the Subscriber 11 how many characters away from the correct Subscriber Key F ASCII character each element is.

Subscriber 11 evaluates 63 the response from Provider 12 and changes the password ($P_I$) into the Subscriber Key F.

The complete process for these postulated values is shown in Table 3.

TABLE 3

| | Subscriber | Provider | |
|---|---|---|---|
| Password | 71, 37, 83, 64, 87, 34, 82, 36 | Response | −38, −2, +14, +19, −23, +66, 0, +66 |
| Decryption Key | 33, 35, 97, 83, 64, 100, 82, 102 | | |

This technique could also be used to encode entire messages if the Provider 12 were to tell the Subscriber 11 how many elements (characters or words) the desired message contains (counting spaces for breaks between elements). The Subscriber 11, for example, asks for a complete account statement from the Provider 12. The Provider 12 in turn sends back (in the clear) that the information the Subscriber 11 requested contains a certain number of elements (e.g., 1,345 characters or 230 words). The Subscriber 11 then sends a random set of elements to the Provider 12 encrypted with the Provider 12's Public Key. The Provider 12 sends back a message (in the clear) that tells the Subscriber 11 how to modify each element of the Subscriber 11's original, random set of elements to arrive at the final Subscriber Key F.

While the invention has been described in terms of several embodiments, including a preferred embodiment, those skilled in the art will recognize that the invention can be practiced with modification within the spirit and scope of the appended claims, and specifically, can be used to transmit secure keys, certificates, tokens and other user keying material of any length in general.

Having thus described our invention, what we claim as new and desire to secure by Letters Patent is as follows:

1. A method of secure key distribution on a nonsecure network, comprising the steps of:

securely transmitting a password generated by a Subscriber to a Provider over said network, said password not being known to said Provider prior to said transmission; and using a method dependent upon said password to securely transfer a decryption key from said Provider to said Subscriber over said network, said password dependent method exploiting the similarities and differences between said password and said decryption key, said decryption key being usable by said Subscriber to securely decrypt subsequent messages encrypted by said Provider and transmitted over said network.

2. The method of claim 1, wherein said secure transmission of a password comprises the steps of:

Provider generation of a public key and a corresponding private key in accordance with a public key encryption scheme;

Provider transmission of said public key to said Subscriber over said network;

Subscriber encryption of said password using said public key; and

Provider decryption of said password using said private key.

3. The method of claim 1, wherein said password dependent method comprises the steps of:

Provider parsing of said password in relation to said decryption key, said password and said decryption key having the same number of corresponding elements, determining for each of said elements whether the password element should be increased, should be decreased, or should remain the same in order to be equal to said corresponding decryption key element;

Provider transmission of said parsing determination to said Subscriber over said network;

Subscriber modification of said password using said parsing determination as a parameter;

Subscriber secure transmission of said modified password to said Provider over said network;

repetition of the foregoing steps until said parsing determination indicates that all password elements should remain the same in order to be equal to said corresponding decryption key elements.

4. The method of claim 3, wherein each said corresponding element is an eight bit binary representation of an ASCII character and wherein the number of said repetitions necessary for said Subscriber to guess said decryption key is no more than eight, wherein said Subscriber modification of each said element to be increased or decreased, respectively, comprises the step of adding or subtracting, respectively, $2^{(n-j)}$ to said eight bit binary representation where n=8 and j=the repetition number wherein the modification is made.

5. An apparatus for secure key distribution on a nonsecure network, comprising:

means for securely transmitting a password generated by a Subscriber to a Provider over said network, said password not being known to said Provider prior to said transmission; and password dependent means for securely transferring a decryption key from said Provider to said Subscriber over said network, said password dependent means exploiting the similarities and differences between the password and the decryption key, said decryption key being usable by said Subscriber to securely decrypt subsequent messages encrypted by said Provider and transmitted over said network.

6. The apparatus of claim 5, wherein said secure transmission means comprises:

means for Provider generation of a public key and a corresponding private key in accordance with a public key encryption scheme;

means for Provider transmission of said public key to said Subscriber over said network;

means for Subscriber encryption of said password using said public key; and means for Provider decryption of said password using said private key.

7. The apparatus of claim 6, wherein said password dependent means comprises:

means for Provider parsing of said password in relation to said decryption key, said password and said decryption key having the same number of corresponding elements, determining for each of said elements whether the password element should be increased, should be decreased, or should remain the same in order to be equal to said corresponding decryption key element;

means for Provider transmission of said parsing determination to said Subscriber over said network;

means for Subscriber modification of said password using said parsing determination as a parameter;

means for Subscriber secure transmission of said modified password to said Provider over said network; and means for repeating said Provider parsing means, said Provider transmission means, said Subscriber modification means and said Subscriber secure transmission means until said parsing determination indicates that all password elements should remain the same in order to be equal to said corresponding decryption key elements.

8. The apparatus of claim 7, wherein each said corresponding element is an eight bit binary representation of an ASCII character and wherein the number of said repetitions necessary for said Subscriber to guess said decryption key is no more than eight, wherein said Subscriber modification of each said element to be increased or decreased, respectively, comprises the step of adding or subtracting, respectively, $2^{(n-j)}$ to said eight bit binary representation where n=8 and j=the repetition number wherein the modification is made.

9. The method of claim 1, wherein said password dependent method comprises the steps of:

Provider parsing of said password in relation to said decryption key, said password and said decryption key having the same number of corresponding elements, determining for each of said elements the amount which should be added or subtracted in order to make the password element equal to said corresponding decryption key element;

Provider transmission of said parsing determination to said Subscriber over said network;

Subscriber modification of said password using said parsing determination as a parameter;

Subscriber secure transmission of said modified password to said Provider over said network.

10. The apparatus of claim 6, wherein said password dependent means comprises:

means for Provider parsing of said password in relation to said decryption key, said password and said decryption key having the same number of corresponding elements, determining for each of said elements the amount which should be added or subtracted in order to make the password element equal to said corresponding decryption key element;

means for Provider transmission of said parsing determination to said Subscriber over said network;

means for Subscriber modification of said password using said parsing determination as a parameter; and means for Subscriber secure transmission of said modified password to said Provider over said network.

11. The method of claim 1, wherein said Subscriber does not possess sufficient computational facility to create a secure crypto-key.

12. The apparatus of claim 5, wherein said Subscriber does not possess sufficient computational facility to create a secure crypto-key.

13. The method of claim 1, wherein said Subscriber does not possess a private key corresponding to a public key which could be made available to said Provider.

14. The apparatus of claim 5, wherein said Subscriber does not possess a private key corresponding to a public key which could be made available to said Provider.

15. The method of claim 2, wherein said password dependent method comprises the steps of:

Provider parsing of said password in relation to said decryption key, said password and said decryption key having the same number of corresponding elements, determining for each of said elements whether the password element should be increased, should be decreased, or should remain the same in order to be equal to said corresponding decryption key element;

Provider transmission of said parsing determination to said Subscriber over said network;

Subscriber modification of said password using said parsing determination as a parameter;

Subscriber secure transmission of said modified password to said Provider over said network;

repetition of the foregoing steps until said parsing determination indicates that all password elements should remain the same in order to be equal to said corresponding decryption key elements.

16. The method of claim 15, wherein each said corresponding element is an eight bit binary representation of an ASCII character and wherein the number of said repetitions necessary for said Subscriber to guess said decryption key is no more than eight, wherein said Subscriber modification of each said element to be increased or decreased, respectively, comprises the step of adding or subtracting, respectively, $2^{(n-j)}$ to said eight bit binary representation where n=8 and j=the repetition number wherein the modification is made.

17. The method of claim 2, wherein said password dependent method comprises the steps of:

Provider parsing of said password in relation to said decryption key, said password and said decryption key having the same number of corresponding elements, determining for each of said elements the amount which should be added or subtracted in order to make the password element equal to said corresponding decryption key element;

Provider transmission of said parsing determination to said Subscriber over said network;

Subscriber modification of said password using said parsing determination as a parameter;

Subscriber secure transmission of said modified password to said Provider over said network.

18. The apparatus of claim 5, wherein said password dependent means comprises:

means for Provider parsing of said password in relation to said decryption key, said password and said decryption key having the same number of corresponding elements, determining for each of said elements whether the password element should be increased, should be decreased, or should remain the same in order to be equal to said corresponding decryption key element;

means for Provider transmission of said parsing determination to said Subscriber over said network;

means for Subscriber modification of said password using said parsing determination as a parameter;

means for Subscriber secure transmission of said modified password to said Provider over said network; and means for repeating said Provider parsing means, said Provider transmission means, said Subscriber modification means and said Subscriber secure transmission means until said parsing determination indicates that all password elements should remain the same in order to be equal to said corresponding decryption key elements.

19. The apparatus of claim 18, wherein each said corresponding element is an eight bit binary representation of an ASCII character and wherein the number of said repetitions necessary for said Subscriber to guess said decryption key is no more than eight, wherein said Subscriber modification of each said element to be increased or decreased, respectively, comprises the step of adding or subtracting, respectively, $2^{(n-j)}$ to said eight bit binary representation where n=8 and j=the repetition number wherein the modification is made.

20. The apparatus of claim 5, wherein said password dependent means comprises:

means for Provider parsing of said password in relation to said decryption key, said password and said decryption key having the same number of corresponding elements, determining for each of said elements the amount which should be added or subtracted in order to make the password element equal to said corresponding decryption key element;

means for Provider transmission of said parsing determination to said Subscriber over said network;

means for Subscriber modification of said password using said parsing determination as a parameter; and means for Subscriber secure transmission of said modified password to said Provider over said network.

* * * * *